United States Patent [19]

Olschewski et al.

[11] 4,294,100

[45] Oct. 13, 1981

[54] METHOD OF MANUFACTURING A SEAMLESS OUTER SLEEVE FOR A BALL BEARING

[75] Inventors: Armin Olschewski, Schweinfurt; Manfred Brandenstein, Eussenheim; Lothar Walter, Schweinfurt; Horst M. Ernst, Eltingshausen; Toni Schulz, Dittelbrunn, all of Fed. Rep. of Germany

[73] Assignee: SKF Kugellagerfabriken GmbH, Schweinfurt, Fed. Rep. of Germany

[21] Appl. No.: 56,738

[22] Filed: Jul. 11, 1979

[30] Foreign Application Priority Data

Jul. 15, 1978 [DE] Fed. Rep. of Germany ....... 2831148

[51] Int. Cl.³ ............................................. B21D 53/10
[52] U.S. Cl. ....................................... 72/340; 72/367; 308/6 C
[58] Field of Search ................. 308/6 C; 72/340, 367, 72/370

[56] References Cited

U.S. PATENT DOCUMENTS

| 1,348,013 | 7/1920 | Larkin | 72/340 |
| 2,576,269 | 11/1951 | Thomson | 308/6 C |
| 2,628,135 | 2/1953 | Magee | 308/6 C |
| 3,263,474 | 8/1966 | Pentland | 72/370 |
| 3,719,979 | 3/1973 | Irwin | 308/6 C |
| 3,876,265 | 4/1975 | McCloskey | 308/6 C |

Primary Examiner—Lowell A. Larson
Attorney, Agent, or Firm—Daniel M. Rosen

[57] ABSTRACT

A method of manufacturing a seamless outer sleeve for a ball bearing, wherein the sleeve is formed of a hollow cylindrical tube section of uniform wall thickness, with race sections paralleling its axis, projecting radially inward, and formed by non-cutting methods, after which the outer circumference of the sleeve section is cut away by the amount of the depth of the race sections. The race sections for the load-carrying balls are non-cuttingly formed by embossing adjoining ends of race sections together with race transitions which are inclined with respect to the longitudinal direction. The race sections can be slightly arcuate with respect to the longitudinal direction of the sleeve and formed by rolling.

8 Claims, 7 Drawing Figures

METHOD OF MANUFACTURING A SEAMLESS OUTER SLEEVE FOR A BALL BEARING

BACKGROUND OF THE INVENTION

The invention relates to a method of manufacturing a seamless outer sleeve for a ball bearing, wherein the race sections paralleling the bearing axis projecting radially inward for the load-carrying balls of the ball bearing are formed by non-cutting methods from a hollow cylindrical tube section of uniform wall thickness. The invention furthermore relates to the application of this method to variously manufactured hollow cylindrical tubes for the outer sleeve.

DESCRIPTION OF THE PRIOR ART

The U.S. Pat. No. 2,628,135 discloses a ball bearing whose seamless outer sleeve has race sections which are produced by an embossing process. The ends of these race sections are adjoined by embossed race transitions disposed at an angle to the longitudinal axis. The known outer sleeve has a uniform wall thickness throughout, so that each ball-carrying race section has a greater radial rigidity in its end areas, where the balls enter and emerge from the load-carrying zone, than they do in the section between these end areas. As a result, the load-carrying balls are unequally loaded, and premature failure of such outer sleeves due to material fatigue is possible in the entry and emergence areas of the sleeves. The above-described unequal radial rigidity of the load-carrying race sections has the additional disadvantage of a non-constant resiliency characteristic, to the detriment of the guiding accuracy of the ball bearing. This is also due to the fact that here there is no direct transfer of force in the area of the load-carrying race sections.

In U.S. Pat. No. 4,062,602, there is disclosed an outer sleeve for a ball bearing having axis-parallel, radially inwardly projecting, continuous race sections for load-carrying balls, manufactured by means of a rolling process.

It is therefore the object of the present invention to manufacture an outer sleeve for a ball bearing which is distinguished by a high rigidity, precision, and uniform resiliency of load-carrying races in the longitudinal direction. It is another object of the present invention to lower the manufacturing cost of the outer sleeve by using a non-cutting method of shaping.

BRIEF DESCRIPTION OF THE INVENTION

The foregoing objectives are achieved in accordance with this invention by a method of manufacturing a seamless outer sleeve for a ball bearing, wherein the sleeve is formed of a hollow cylindrical tube section of uniform wall thickness, with race sections paralleling its axis, projecting radially inward, and formed by non-cutting methods, after which the outer circumference of the sleeve section is cut away by the amount of the depth of the race sections. The race sections for the load-carrying balls are non-cuttingly formed by embossing adjoining ends of race sections together with race transitions which are inclined with respect to the longitudinal direction. The race sections can be slightly arcuate with respect to the longitudinal direction of the sleeve and formed by rolling.

BRIEF DESCRIPTION OF THE FIGURES

Further details and advantages of the invention are described and explained hereinbelow with the aid of embodiments diagrammatically represented in the drawing, wherein.

DESCRIPTION OF THE PREFERRED EMBODIMENT

Figure 1:
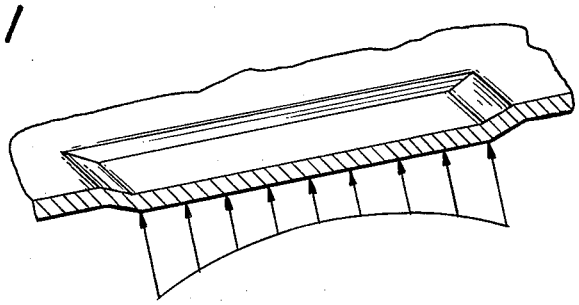
FIG. 1 is a fragmentary perspective representation of an embossed race section of a ball bearing in accordance with the prior art, showing the distribution of the load to the load-carrying balls resulting from differences of resilience under load.

In FIG. 1 there is shown a ball race section of a known ball bearing, which is a deformed or embossed outer sleeve. Also shown by means of arrows is the load distribution of the balls (not shown) which pass under load through this section. From this drawing it can be seen that the load-carrying balls are more heavily loaded in the end portions of each race section than they are in the middle portion thereof, for reasons previously stated.

Figure 2:
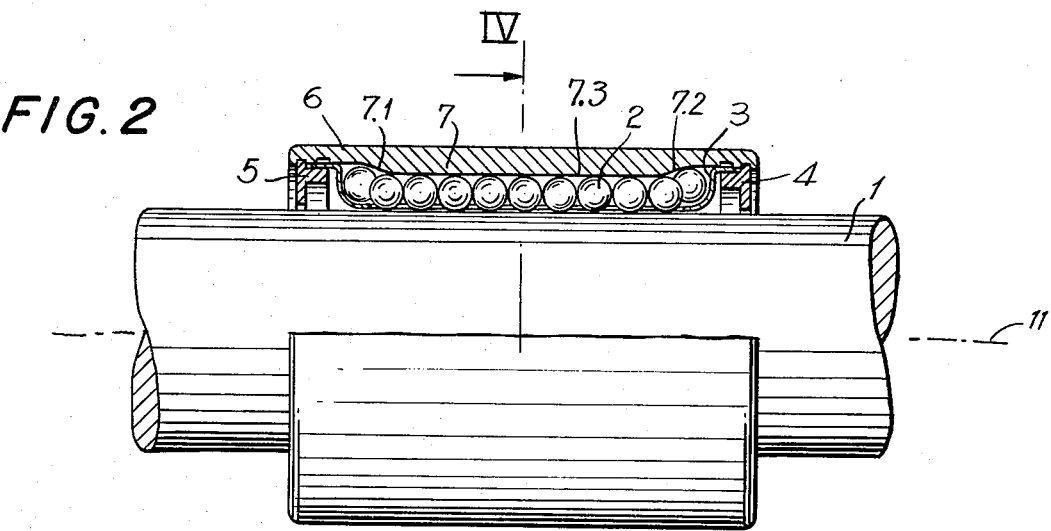
FIG. 2 shows a fragmentary longitudinal sectional view of a ball bearing of the invention on a shaft.

In FIG. 2 there is shown a ball bearing of the present invention which is mounted on a shaft 1 and consists essentially of a plurality of sets of balls 2 disposed in trains, a cage 3 receiving the balls and having end rings 4 and 5, and an outer sleeve 6.

The cage 3 is a sheet metal cage of conventional construction consisting of rectilinear sections and curved sections joining the rectilinear sections together in pairs, and forming guide channels filled with the balls 2. Each guide channel of the cage 3 is conventionally provided with an approximately C-shaped section which is open radially inwardly, in whose straight portion the balls 2 engage the shaft 1 to support the load. In the approximately straight section of each guide channel connected to this C-shaped section, however, the balls 2 are kept away from the shaft 1 for recirculation.

The outer sleeve 6 has on its inside, within each of the load-bearing zones, an embossed race section 7 projecting radially inwardly and situated parallel to the axis 11. At each end of the race section is a ramp-like embossed ball race transition, 7.1 and 7.2, sloping gently upward at each end. The radially super-elevated race sections disposed parallel to the axis 10 have approximately the shape of a truncated pyramid of trapezoidal longitudinal section, and a ball race 7.3 disposed centrally thereon and parallel with the axis of the ball bearing. The outer sleeve 6 has a smooth cylindrical outer surface. It is optional for the axial fixation of the ball bearing to provide an annular groove at each end of sleeve 6.

Figure 3:
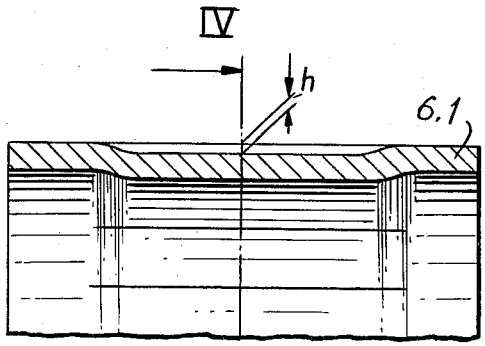
FIG. 3 is a fragmentary longitudinal sectional view taken through half of an outer sleeve showing a load-carrying ball race section which has been embossed but not yet machined.

A hollow circular cylinder made, for example, of drawn steel tubing or rolled steel plate serves as a semifinished product for the making of the outer sleeve 6. In this cylinder of uniform wall thickness, the radially inwardly superelevated sections of the race on the inside of what is afterward to be the outer sleeve are formed by known methods of embossing the race section together with the race transitions which are inclined with respect to the long axis, so that the sleeve section 6.1 shown in FIG. 3 is the result. Then the outer circumference of the embossed sleeve section 6.1 is machined away, by turning for example, by the amount of the embossing depth h, so that the wall thickness of the resulting outer sleeve 6 adjacent the radially superelevated, axis-parallel race sections 7 is greater than that of the rest of the outer sleeve.

Figure 4:
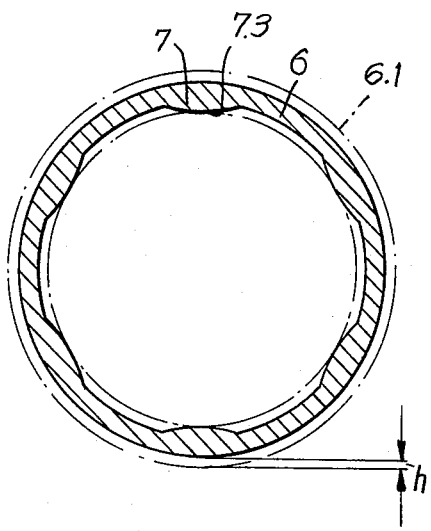
FIG. 4 is a cross-sectional view taken along line IV—IV in FIGS. 2 and 3.

In FIG. 4 there are shown two cross sections, one in broken lines indicating the cross section of the embossed sleeve section 6.1 before it is turned, and the other in solid lines indicating the cross section of the finished outer sleeve 6. After the sleeve section 6.1 has been turned, grooves are cut for the fastening of the end rings 4 and 5 and cage 3 to the ends of the sleeve, and then the outer sleeve is hardened. Thereafter the bore of the outer sleeve, indicated by the broken line in FIG. 4, the outside diameter and the ends are ground. The purpose of grinding the bore of the outer sleeve is to create the races 7.3 on the embossed race sections 7.

It is also possible, however, in making the radially superelevated, axis-parallel race sections, to form simultaneously therein by non-cutting methods a ball-guiding groove whose bottom is conformed to the load-carrying balls.

Because of the difference in wall thickness which is obtained by such manufacture of the outer sleeve, it is advantageously possible for the load-carrying race sections, which are stiffer than the remainder of the outer sleeve, to yield resiliently only parallel to the race direction, since the transitions of the race represent a kind of weak-point articulation. In other words, the spring characteristic along each load-carrying race is constant, i.e., the balls are uniformly loaded in the load-carrying zones, which in turn results in a very good accuracy of guidance and ultimately in a relatively long life of the ball bearing. A further improvement of the ball bearing is possible if the load-carrying, embossed race sections and the inclined race transitions in the outer sleeve merge gradually with one another.

Figure 5:
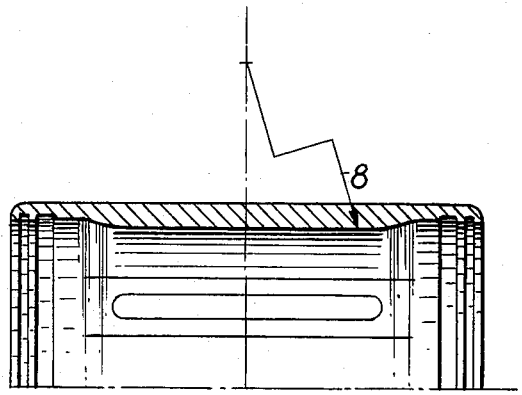
FIG. 5 is a longitudinal sectional view taken through a turned half of an outer sleeve, in which the races of the load-carrying race sections are made slightly arcuate.

It may also be desirable to make the race surfaces of the embossed race sections slightly arcuate longitudinally, as indicated by the arrow 8 in FIG. 5. The race surface rendered slightly convex longitudinally is produced simultaneously with the embossing of the load-carrying race sections. With a race surface of this kind it is possible to compensate for slight flexing of the shaft.

Figure 6:
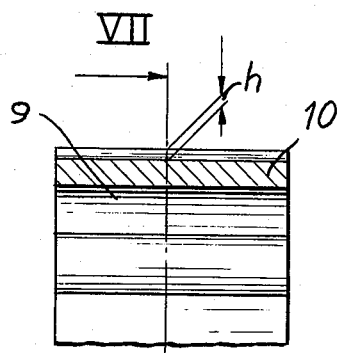
FIG. 6 is a longitudinal sectional view taken through half of an outer sleeve having a rolled, non-machined, load-carrying, continuous ball race section.
Figure 7:
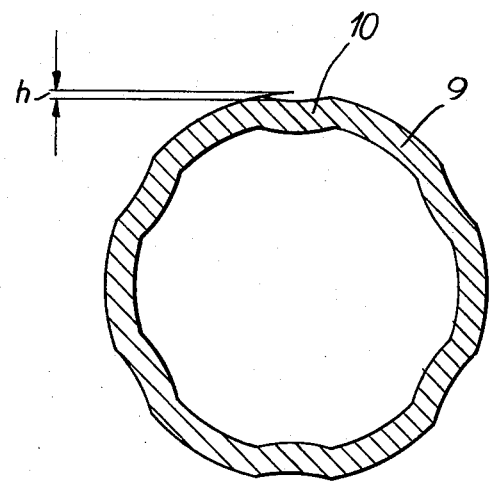
FIG. 7 is a cross-sectional view taken along line VII in FIG. 6.

Lastly, in FIGS. 6 and 7 there is shown a sleeve section 9 severed from a shaped tube, as it appears prior to the machining away of its outer circumference, the shaped tube being made by rolling the race sections 10 into a drawn steel tube in a conventional manner.

The advantages achieved by the invention are to be seen substantially in the fact of the difference in wall thickness between the embossed or rolled race sections and the remainder of the outer sleeve, which is obtained by a machining operation, e.g., by turning. This difference makes it possible for the load-carrying race sections to yield resiliently in a uniform manner parallel to the axis whenever a ball is drawn into the space between the outer sleeve and a shaft receiving the ball bearing which is narrowed in the area of the load-carrying race section or is pushed out of this interstice. At the same time the inclined, embossed race transitions make it possible for the balls entering into the load-carrying zone to enter with low friction into the narrowed interstice, and for the balls exiting from this load-carrying zone to emerge from this interstice with low friction, so that the requirements set forth above are satisfied in a highly satisfactory manner.

Finally, the method of the invention makes it possible to both exploit the advantages of a non-cutting forming process (such as, for example, an uninterrupted fiber structure in the area of the load-carrying races), and to minimize the cost of the manufacture of such an outer sleeve, because the mere turning of the outer sleeve on a lathe is a relatively simple procedure.

Other variations and modifications will be apparent to those skilled in the art.

What is claimed is:

1. In a method of manufacturing a seamless outer sleeve for a ball bearing from a hollow cylindrical tube of predetermined outer diameter and uniform wall thickness to have radially inwardly projecting race sections parallel to the tube's central axis for the load-carrying balls of the ball bearing with inclined race transition sections at each end of each load-bearing section, the method steps comprising (a) forming only said axial race sections by deformation to a depth d radially inward of said outer diameter, and (b) cutting away the outer circumference of the sleeve by the amount of the forming depth d of the race sections thereby forming at each end of each load-bearing section a ramp having thickness less than that of said load-bearing sections.

2. The method of claim 1 wherein forming said race sections comprises embossing said race sections together with race transitions adjoining the ends of said race sections to be inclined with respect to the longitudinal direction of said sleeve.

3. The method of claim 2, wherein each race section has an inner surface, comprising the further step of forming said inner surfaces of said race sections to be slightly arcuate as viewed in the longitudinal direction, when embossed.

4. In a method of manufacturing a seamless outer sleeve for a ball bearing, the sleeve to have a plurality of endless raceways, each including a load-bearing race section extending parallel to the sleeve's central axis and radially inward, inclined race transition sections at each end of the load-bearing race section, and a return connecting the transition sections, the steps comprising:

a. providing a circular cylindrical tube having uniform wall thickness, b. forming said load-bearing race sections by deforming said sleeve radially inwardly only in the areas of said load-bearing race sections, thereby forming for each of said race sections an axial depression extending radially inward in the outer surface of said sleeve and a corresponding axial projection extending radially inward in the bore surface of said sleeve, with said sleeve's outer circumferential surface being thus deformed in cross-section of said race sections to a non-circular shape, and with the sleeve's radius to the outer surface of each deformed area being less than the radius to adjacent undeformed outer surface by a radial depth dimension d, and with said transition sections having thickness less than that of the load-bearing race sections, and c. cutting away the undeformed outer surface of the sleeve by a radial depth d, whereby said outer sleeve becomes circular.

5. A method according to claim 4, wherein each of said load-bearing race sections is generally parallel to the central axis of the sleeve, comprising the further step of forming ends of each race section as race transitions which extend axially from said race section and are inclined radially outward from said race section.

6. A method according to claim 4, wherein said step of deforming said sleeve comprises forming said load-bearing race sections to have a slightly arcuate surface which is convex in the radially inward direction.

7. In a method of manufacturing a seamless outer sleeve for a ball bearing, the sleeve to have a plurality of endless raceways, each including load-bearing race section extending parallel to the sleeve's central axis and radially inward, inclined race transition sections at each end of the load-bearing race section, and a return connecting the transition sections, the steps comprising:

a. providing a circular cylindrical tube having uniform wall thickness, b. forming said load-bearing race sections by deforming said sleeve radially inwardly only in the areas of said load-bearing race sections, thereby forming for each race section an axial depression extending radially inwardly in the outer surface of said sleeve and a corresponding axial projection extending radially inward in the bore surface of said sleeve, with said sleeve's outer circumferential surface being thus deformed in cross-section of said race sections to a non-circular shape, and with the sleeve's radius to the outer surface of each deformed area being less than the radius to adjacent undeformed outer surface by a radial depth dimension d, and c. cutting away the undeformed outer surface of the sleeve along the full length of the raceways including the load-bearing race section and transition sections until said outer surface has a uniform radius, so that the transition sections have thickness less than that of the load-bearing sections.

8. In a method of manufacturing a seamless outer sleeve for a ball bearing, the sleeve to have a plurality of endless raceways, each including a load-bearing race section extending parallel to the sleeve's central axis and radially inward, inclined race transition sections at each end of the load-bearing race section, and a return connecting the transition sections, the steps comprising:

a. providing a circular cylindrical tube having uniform wall thickness, b. forming said load-bearing race sections by deforming said sleeve radially inwardly only in the areas of said load-bearing race sections, thereby forming for each race section an axial depression extending radially inward in the outer surface of said sleeve and a corresponding axial projection extending radially inward in the bore surface of said sleeve, with said sleeve's outer circumferential surface being thus deformed in cross-section of said race sections to a non-circular shape, and with the sleeve's radius to the outer surface of each deformed area being less than the radius to adjacent undeformed outer surface by a radial depth dimension d, and c. cutting away the undeformed outer surface along the full length of the raceways until said sleeve wall thickness is less in the areas of said transition sections than in the areas of said load-bearing raceways.

* * * * *